United States Patent [19]

Elliott et al.

[11] Patent Number: 4,961,142

[45] Date of Patent: Oct. 2, 1990

[54] MULTI-ISSUER TRANSACTION DEVICE WITH INDIVIDUAL IDENTIFICATION VERIFICATION PLUG-IN APPLICATION MODULES FOR EACH ISSUER

[75] Inventors: John C. Elliott, Summit; James A. O'Connell, Short Hills, both of N.J.; Lawrence Ladouceur, Scarsdale, N.Y.; William Altman, Lower Paxton, Pa.; Keith Jarett, Oakland, Calif.

[73] Assignee: MasterCard International, Inc., New York, N.Y.

[21] Appl. No.: 212,892

[22] Filed: Jun. 29, 1988

[51] Int. Cl.$^5$ .................. G07F 19/00; H04L 9/00; G06F 15/30

[52] U.S. Cl. .................. 364/408; 235/380; 902/26; 380/24

[58] Field of Search .............. 364/408; 235/379, 384; 902/26; 380/24

[56] References Cited

U.S. PATENT DOCUMENTS

| | | | |
|---|---|---|---|
| 4,186,871 | 2/1980 | Anderson et al. | 380/24 |
| 4,423,287 | 12/1983 | Zeidler | 380/24 |
| 4,500,750 | 2/1985 | Elander et al. | 380/24 X |
| 4,709,136 | 11/1987 | Watanabe | 902/26 X |
| 4,709,137 | 11/1987 | Yoshida | 902/26 X |
| 4,727,244 | 2/1988 | Nakano et al. | 902/26 X |
| 4,731,842 | 3/1988 | Smith | 380/24 |
| 4,746,788 | 5/1988 | Kawana | 235/380 |
| 4,747,050 | 5/1988 | Brachtl et al. | 364/408 |
| 4,755,940 | 7/1988 | Brachtl et al. | 364/408 |
| 4,797,920 | 1/1989 | Stein | 380/24 |
| 4,799,061 | 1/1989 | Abraham et al. | 380/24 X |

FOREIGN PATENT DOCUMENTS 0159992  8/1985  Japan .

OTHER PUBLICATIONS

"Transaction Completion Code Based On Digital Signatures", *IBM Tech. Discl. Bul.*, vol. 28, No. 3, Aug. 1985, 1109-1122.

*Primary Examiner*—Clark A. Jablon
*Attorney, Agent, or Firm*—Brumbaugh, Graves, Donohue & Raymond

[57] ABSTRACT

A transaction terminal for use with diverse credit or other transaction cards is provided with an interface unit for receiving a plurality of modules, wherein each module contains programming information corresponding to transactions that may be carried out with at least one of the diverse identification cards presented to the machine. Accordingly, financial institutions who issue cards can independently arrange and program their own security and transaction routines which are to be carried out with the cards and distribute such routines in a secure manner for use on a common terminal.

13 Claims, 2 Drawing Sheets

MULTI-ISSUER TRANSACTION DEVICE WITH INDIVIDUAL IDENTIFICATION VERIFICATION PLUG-IN APPLICATION MODULES FOR EACH ISSUER

BACKGROUND OF THE INVENTION

The present invention can be used in a variety of terminals for processing transactions involving credit cards, debit cards, bank convenience cards or other personal transaction identification devices. In particular the present invention is applicable to terminals and transactions involving "smart cards", which are personal identification devices which include data memories and microprocessor devices for processing data during a transaction.

Smart card identification devices have the capability of providing greater security against fraudulent transactions in transaction formats wherein the transaction terminal equipment operates "off-line", i.e. without having data communication with a central computer system for verifying the authenticity of the card or the identification of the card user. The security provisions which enable such off-line transactions require the use of specialized terminal software which operates in conjunction with smart card circuitry to verify the authenticity of the card and identity of the card user. Such security provisions may include cryptographic software and cryptographic keys which are under the control of the card issuing organization. It is anticipated that as smart cards come into general use, each card issuing organization will develop its own security software and keys and will maintain these in high security.

In the case of a transaction terminal, for example in a retail store, hotel or restaurant, the implementation of smart card technology by various card organizations would require the installation of separate and non-compatible equipment for accommodating the different security formats which are to be accepted. Unlike non-secure credit card systems, it is unlikely that common formats will be developed or adapted, because issuing organizations would be reluctant to release to others any knowledge or control over the security process that prevents fraudulent use of their cards.

In addition, while the use of smart cards is being introduced into the transaction system, it is desirable that the transaction terminal be capable of accommodating transactions using conventional credit cards having non-secure magnetic stripe data memories.

It is therefore an object of the present invention to provide new and improved transaction equipment for use with diverse personal transaction identification devices, each having different transaction format requirements.

It is a further object of the present invention to provide such equipment wherein the structure, programming and data used in security operations of the terminal for various issuing organizations is maintained under the separate control of each issuing organization.

SUMMARY OF THE INVENTION

In accordance with the present invention, a transaction terminal for credit cards or other transaction cards is provided with one or more insertable application modules. Each module is preferably an intelligent or "active" device and contains application programs, encryption algorithms, and stored keys corresponding to transactions for the card of a particular issuer. Accordingly, financial institutions who issue cards can independently arrange and program their own security and transaction routines and store such routines in a physically secure manner in the modules.

The fact that the application modules can be made relatively small, e.g. housed in a plastic card, are electronically secure, and can easily be plugged into or removed from the terminal results in a simple, low cost, and secure means of distributing application software and of providing key distribution and management to a large number of remote terminals, e.g. by mailing modules to the various merchants or other terminal users. It also permits card issuers easily to vary application programming and to change keys in the same manner. It also, and importantly, permits a single terminal to accept cards from a number of different card issuers. Further, it provides the terminal the flexibility to accept modules for other purposes, such a diagnostic module for checking the processor of the terminal.

Secure distribution of application programs and key distribution and management are a requirement of most card terminals. The application modules of the present invention offer a new and better way to distribute application programs, and to provide key management and distribution, to any type of terminal using application programs, encryption, and keys, including remote, off-line terminals, remote on-line terminals, cash dispensing bank terminal (ATM's), and so on.

In accordance with the invention there is provided an electronic transaction device for performing transactions with any one of a plurality of diverse personal identification devices, which include stored identification data and are adapted to be used for transactions having diverse formats, including at least one personal identification device having a device microprocessor and a device program for carrying out transactions with the transaction device. The transaction device includes first interface means for receiving any of the personal identification devices and for generating first data signals corresponding to identification data stored on the personal identification devices. There is also provided second interface means, including a plurality of receiving portions, for simultaneously receiving a plurality of program modules and for generating second data signals corresponding to data stored on the program modules. At least one program module is connected to one of the receiving portions and includes a module microprocessor, a module program, and a transaction program for carrying out transactions with the personal identification device having a device microprocessor, and wherein the module program is arranged to be executed by the module microprocessor. Finally there is provided a first data processing means coupled to operate and receive data from the first and second interface means and including a control program responsive to the first data signals for selecting and loading the second data signals corresponding to a transaction program stored in a program module connected to the second interface means and for executing the transaction program.

In accordance with the invention there is provided a method for executing a transaction using a personal identification device having stored identification data and an electronic transaction device adapted to receive the identification device and read identification data therefrom. The transaction device includes data processing means including a first control program and at least one program module, said module including a module microprocessor, at least one stored transaction program and at least one stored module program. According to the method of the invention, the personal identification device is connected to the transaction device and the data processing means of the transaction device is operated under the control program to read identification data from the identification device and to select one of the program modules and one of the stored transaction programs in accordance with the identification data. Thereafter the data processing means is operated under the control program to load the selected transaction program from the selected program module and operated under the transaction program to execute portions of a transaction and the module microprocessor is operated under the module program to execute portions of a transaction.

For a better understanding of the present invention, together with other and further objects, reference is made to the following description, taken in conjunction with the accompanying drawings, and its scope will be pointed out in the appended claims.

DESCRIPTION OF THE INVENTION

Figure 1:
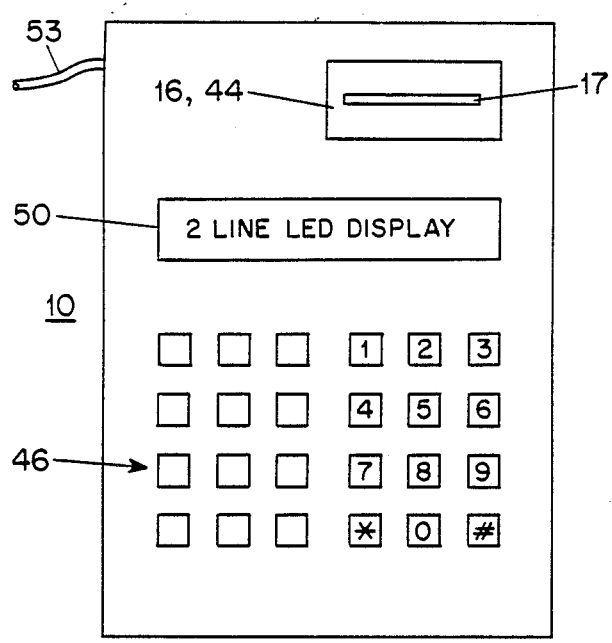
FIG. 1 is a plan view of the top of a transaction device in accordance with a preferred embodiment of the present invention.
Figure 2:
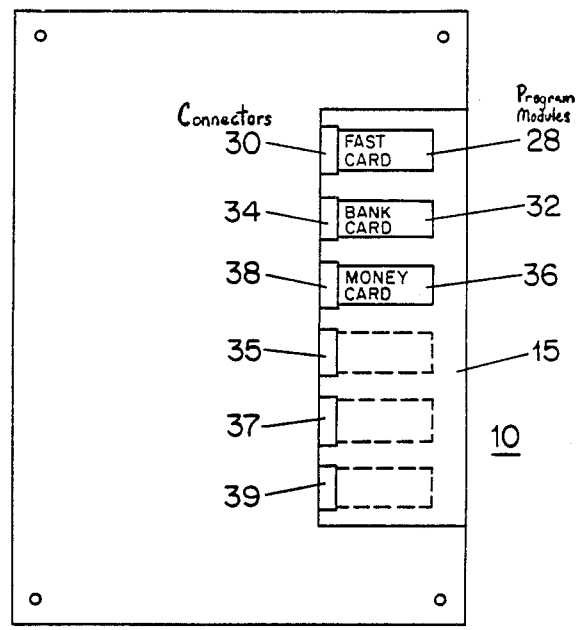
FIG. 2 is a plan view of the bottom of the FIG. 1 transaction device.

FIGS. 1 and 2 illustrate respectively the top and bottom of a countertop, point-of-sale transaction device 10 in accordance with the present invention. As illustrated the device is arranged to execute transactions utilizing either integrated circuit credit cards or conventional magnetic stripe credit cards. As shown in FIG. 1, the transaction device includes a keyboard 46 containing numeric keys on the right and control keys on the left. A display 50 is provided for displaying entered transaction data and messages to the operator. A slot 17 is provided for receiving a personal identification device, such as a credit card, and includes an integrated circuit card connector 16 and magnetic stripe reader 44. A telephone connection 53 is also provided as well as a power connector which is not illustrated.

As illustrated in the bottom view of FIG. 2, the bottom side of the transaction device includes a recess 15 which is normally concealed by a cover plate (not shown). Within recess 15 there are provided a plurality of connectors 30, 34, 38, 35, 37, 39, each for receiving a program module to be supplied by an independent transaction card agency to provide the terminal with the capability of executing transactions utilizing cards issued by that agency. A merchant using the transaction device 10 will separately obtain these program modules to correspond to the credit cards which are honored at his establishment. The device 10 illustrated for example in FIG. 2 has been provided with three program modules 28, 32 and 36 connected respectively to connectors 30, 34 and 38. The modules may be in the form of plastic cards, containing electronic components as described below, that snap into the recesses 15, and can similarly be removed and replaced.

Figure 3:
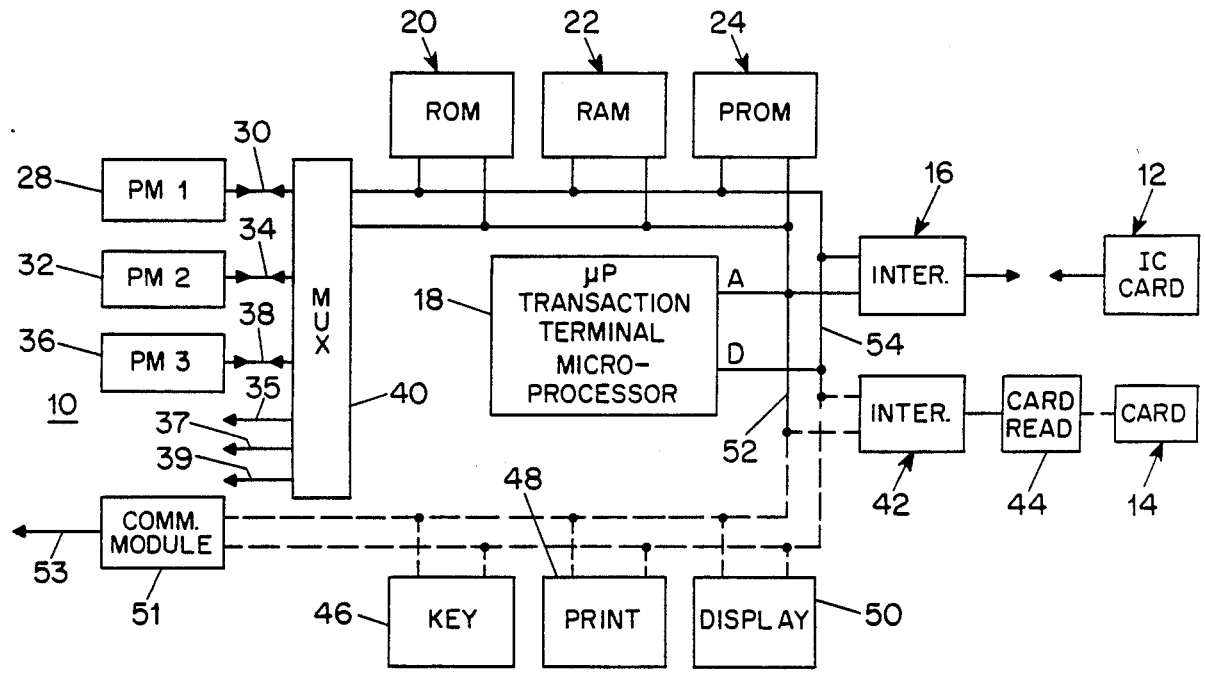
FIG. 3 is a block diagram of the FIG. 1 transaction device.

FIG. 3 is block diagram illustrating the electronic arrangement of the electronic transaction device 10. The transaction device 10 is arranged to operate in connection with an integrated circuit personal identification device, such as a smart card 12. As shown by dotted lines in FIG. 3, device 10 in a preferred arrangement may also operate in connection with a conventional magnetic stripe credit card 14. The device 10 includes a microprocessor 18 which controls and coordinates operation of the transaction device. The microprocessor 18 is connected to interface equipment and to memory equipment using an address bus 52 and a data bus 54. Those skilled in the art will recognize that the precise configuration of the address and data buses or a combination thereof would depend upon the connection arrangements of the particular microprocessor being used in the terminal. The terminal device includes an interface 16, which may include one member of an electrical connector which is specially arranged to provide electrical connections to the circuit in IC card 12. Memory portions 20, 22 and 24 provide read only memory, random access memory and programmable read only memory for use in connection with the operations of microprocessor 18. These memory elements are directly connected to the address and data buses of microprocessor 18. Optionally, the terminal device 10 may include a further interface device 42 and a magnetic stripe card reader 44 so that the device may be used with conventional credit cards in addition to integrated circuit credit cards.

Additional equipment shown in connection with terminal 10, which is frequently provided for a transaction terminal according to the type of transaction which the terminal is to execute, includes a keyboard 46, a printer 48, for printing a paper record or receipt of the transaction, and a CRT display 50. Preferably, the device 10 is capable of providing "on line" transactions, wherein the transaction is verified by a remote computer which includes stored information about the account to which card 12 relates. For such purpose, there is provided a communications module 51 which connects the microprocessor buses 52 and 54 to an external communication line 53 for providing data communications with a remote computer.

Microprocessor 18 is connected to a multiplexer and interface device 40 which is controllable to provide data communications through connectors 30, 34 and 38 with a selected program module among the group of modules 28, 32 and 36 which are illustrated in the drawings. Multiplexer 40 is illustrated to include additional connectors 35, 37 and 39 to which additional program modules may be connected. Multiplexer 40 responds to control signals provided by microprocessor 18 to select one of the program modules and also includes circuits for providing a communications interface, similar to the function provided by interface unit 16, to cause the transfer of data and/or programs between modules 28, 32 and 36 and microprocessor 18, as will be further described.

Figure 4:
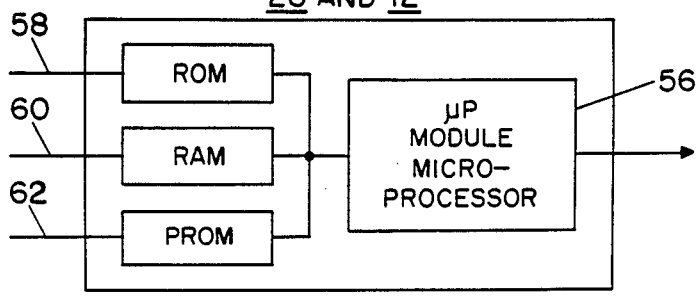
FIG. 4 is a block diagram applicable to both the IC card and a program module for use with the FIG. 1 transaction device.

FIG. 4 is a block diagram illustrating the preferred arrangement for one of the program modules 28 of the terminal of FIG. 1. In a preferred arrangement, for executing high security transactions, module 28 includes a microprocessor 56 and its associated read only memory 58, random access memory 60, and programmable read only memory 62. In a simpler, less secure format, program module 28 may include only read only memory or programmable read only memory. Various module types may be included in a transaction terminal 10 to accommodate various transaction formats.

For purposes of describing the operation of terminal 10 and module 28 with integrated circuit card 12, an explanation will be given of a preferred form of security processing, which will be useful in connection with a terminal according to the present invention. The security measures, which are preferably used for financial transactions, make use of a non-reversible encrypting algorithm in which multiple computations are done on a number to be encrypted using another supplied number, which is held in secret and referred to as a key, to generate an encrypted number from which neither the original number nor the key can be obtained, except by a reverse decrypting process using the same algorithm and the same key. Preferably the encrypting and decrypting algorithms are different, but are arranged so that if a given number is encrypted using a given algorithm and a given key, the decrypting process using the appropriate decrypting algorithm and the same key will result in the original number.

An important aspect of preserving security in an encryption system of this type is to preserve the secrecy of the key or keys used in connection with the encryption. One technique for preserving the security of an encrypting key is to distribute devices which include a derived key rather than the original key and to arrange such devices so that the derived key is not accessible outside the device. In connection with a system using an integrated circuit card 12 which includes a microprocessor, the integrated circuit card may include a single chip microcomputer having a block diagram identical to the diagram of module 28, shown in FIG. 4, wherein the integrated circuit card includes on a single integrated circuit chip a microprocessor, a read only memory which includes a program for operating the microprocessor including a security algorithm program, a random access memory for temporary storage of numbers during computations or transactions, and a programmable read only memory which may include records of transactions and may also have zones which include keys used in the encrypted process. The programmable read only memory may also include secret information, such as a customers personal identification number, or other secret information useful in identifying a customer, such as biometric data or biographical data, which would not be known to someone attempting fraudulent use of the card.

All of the secret data which is contained in programmable read only memory on the integrated circuit card 12 is arranged in memory portions which are prevented from being accessed by the permanently provided program on a read only memory of the card. Likewise, the program on the read only memory of the card is arranged to avoid access to the encrypting algorithm used by the card, even though security does not require absolute secrecy of the encrypting algorithm, but does require security of the encrypting key used. In addition to the secret information on the card, and information regarding transactions, which should not be accessed unless there is an authentication of the terminal to which the card has been connected, there may be provided on the memory of the card, such as the programmable read only memory portion of the memory, data which will identify the organization which issued the card and the cardholder's account number, so that a terminal can determine the card type and read the account number and card issuer identification. This information is arranged to be read electronically without authentication of the card terminal device to the card and is used by the terminal to formulate the derived key contained on the card.

In a system using secure integrated circuit cards 12, there must be provided primary keys, which are preferably maintained at a higher level of security than the derived keys which are electronically stored in the memories of issued cards. The derived keys which are provided on the actual cards are keys which can be derived using a primary key and the identification information which can be read from the card. For example, if the account number of the cardholder's account (ID) is encrypted by an algorithm using a primary key (PK) of the system, there can be provided a derived key (DK), which can be derived from the primary key and the account number, and used by a terminal to access the card. This derived key can be stored on the card without the risk of jeopardizing the security of the primary key. Accordingly, in order that a terminal and an integrated circuit card can provide security check functions utilizing the same key in an algorithm, the terminal must be provided with a primary key so that it can compute the derived key using the primary key and public information on the integrated circuit card, such as the issuing bank and the account number. The terminal can then conduct secure communications with the integrated circuit card. The integrated circuit card on the other hand, does not need to have in its storage the primary key but merely needs to have the derived key. At the start of a transaction the terminal within one of program modules 28, 32 and 36 can perform secure computations to derive the appropriate key for use with the card that has been inserted.

For purposes of security there may be a number of available primary keys, only one of which need be available to the program module in a particular terminal. In order to function with all terminals, the integrated circuit card 12 must have derived keys which correspond to all of the primary keys. In order to arrive at a common key, the terminal derives a key which will be one of the derived keys for the card, and identifies to the card which primary key it is using so that the card can select one of the derived keys in its memory for purposes of secure communications. Accordingly, it becomes possible to provide only a single primary key to the terminal and provide a plurality of derived keys, each dependent on one of the primary keys, to the IC card so that the primary key can be changed from time to time to avoid compromise or so that various terminals can use various primary keys. Where a primary key is suspected of being compromised, its use can be discontinued.

Since the transaction terminal must include at least one primary key from which all derived keys on IC cards can be derived, the control of the primary key is important to providing security against fraudulent activities. Accordingly, each issuing organization would seek to have the utmost control over the manufacture and distribution of devices which include their primary keys, even though the primary keys are contained in a memory circuit in an arrangement which prevents the reading of the primary keys from the circuit.

The device according to the present invention provides a system wherein each card issuing organization can have separate control over the manufacture programming and distribution of modules, such as modules 28, 32 and 36, which contain the programs for carrying out its security and/or transaction routines and include primary keys for obtaining access to, and controlling the security of, a transaction involving its own integrated circuit cards. The transaction device 10 according to the present invention provides separate program modules for each of the issuing organizations, which are connected to a single transaction device, capable of executing transactions according to the routines of each of the issuing organizations, and capable of receiving separately manufactured and distributed program modules from each organization, which are manufactured, programmed and encrypted according to the standards of the organization and under their supervision and control.

The terminal 10 according to the present invention functions under an overall control program which is provided in read only memory 20 which is executed in microprocessor 18. In the course of executing the control program or other programs microprocessor 18 may make use of random access memory 22 for temporary storage of programs or data and may also make use of programmable read only memory 24 for storage of records of transactions which have taken place. As an alternate to a programmable read only member 24 the transaction device 10 may include a disc or tape storage device for storing transaction records to be later provided to card issuing organizations for purposes of billing the transactions.

Each of the program modules 28, 32 and 36, as previously indicated, is provided by a card issuing organization and includes storage for storing programs and data suitable for carrying out the particular transactions authorized by the issuing organization for owners of its own accounts. In certain cases, the program modules may be relatively simple and merely provide instructions for carrying out an on-line transaction using the magnetic stripe on an ordinary credit card 14 which is read by card reader 44. In the case of more complex, off-line approved transactions, such as those which take place with an integrated circuit card 12, each program module 28 includes a microprocessor 56 with its own program and data, for verifying security and performing other functions in connection with a transaction.

The arrangement of the terminal 10 is such that, upon insertion of a card 12 or 14, the control program in read only memory 20 causes microprocessor 18 to read information from the card through interface 16 or interface 42 and card reader 44. This information is processed to determine if the card which has been received is one for which the terminal has been programmed and, if so,.to select an appropriate transaction program from one of modules 28, 32 or 36 for further operation. The control program in read only memory 20 would include alternate program routines for control of multiplexer 40 and for performing the loading of the selected transaction program.

When a program has been selected, microprocessor 18 acting through multiplexer 40 and its associated interface circuits, reads the program from the appropriate program module and loads it into random access memory 22, for execution by microprocessor 18. In the case of a relatively simple program, for example, one for use with a conventional magnetic stripe card 14, the program may call for entry of transaction data and initiate a communication with a host processor through communications module 51. Where the transaction is one using an integrated circuit card containing a microprocessor and security arrangements, a more complex program may be executed by microprocessor 18, in connection with the microprocessor 56 of the selected program module, and also the microprocessor contained in integrated circuit card 12.

Figure 5:
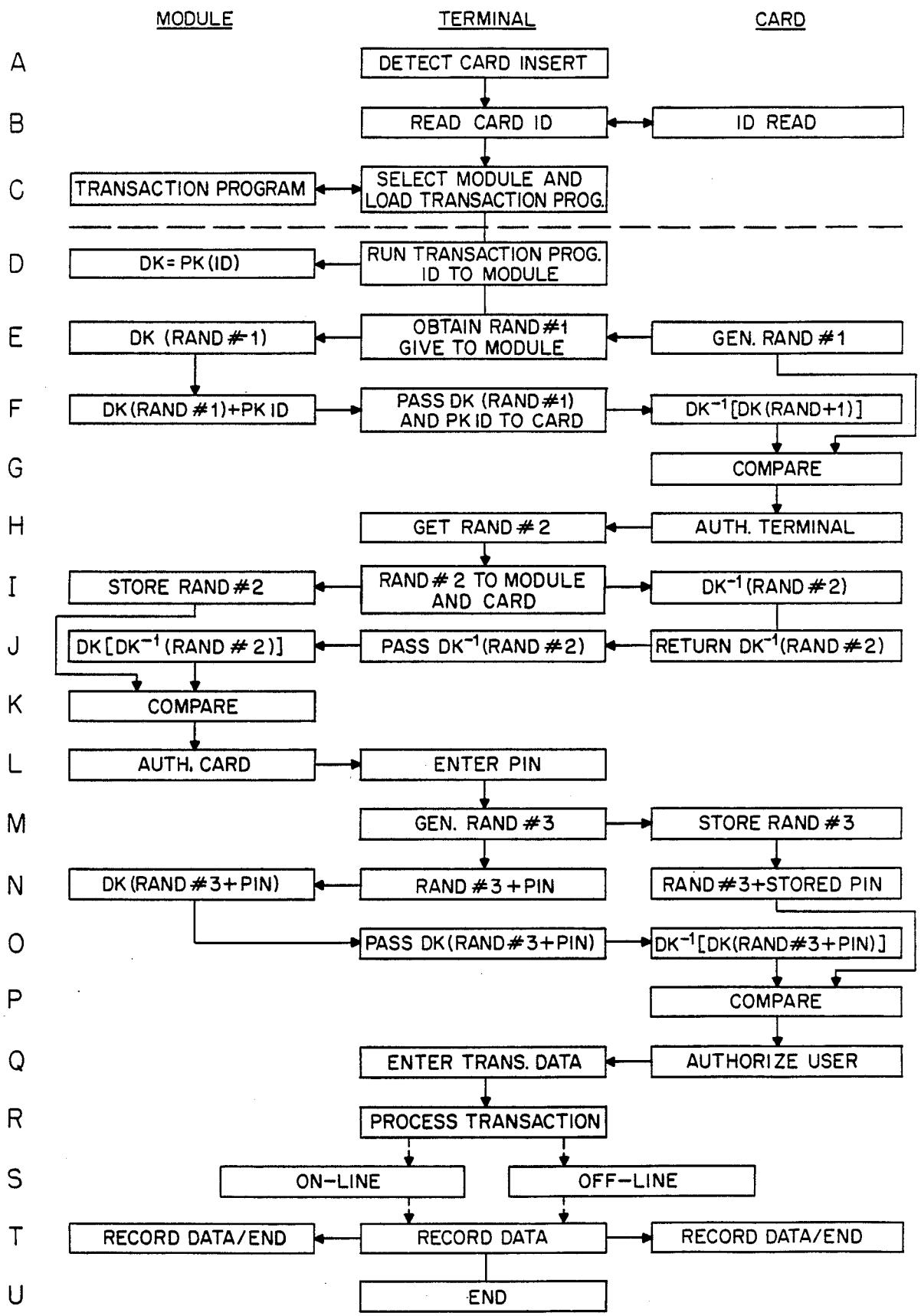
FIG. 5 is a flow diagram illustrating the operation of the FIG. 1 device in accordance with a preferred embodiment of the method of the present invention.

FIG. 5 is a flow diagram indicating steps in an exemplary transaction program for use with an integrated circuit containing card 12 and a microprocessor containing program module 28. As shown in FIG. 5 the steps which take place are separated into the elements of the system which perform the steps. The program which is illustrated in FIG. 5 includes program steps which take place in the program module 28, the terminal microprocessor 18 and a microprocessor on an integrated circuit card 12.

At the initiation of a transaction, a card is inserted into the terminal device 10 and the card insertion is detected by the terminal microprocessor. (Step A) Operating power is supplied to the integrated circuit card and the public information memory of the integrated circuit card is read by the terminal microprocessor to obtain from the card the publicly available card identification data (ID), indicating, for example, the bank which issued the card, the type of card, and the account number assigned to the card. (Step B) This card identification information is used to select one of the program modules 28, 32 and 36 and, where such modules have multiple transaction programs, to select one of the transaction programs from the program module to be loaded into random access memory 22 for execution by microprocessor 18. The selection process may be performed, for example, by polling the available modules. (Step C) Once the transaction program has been loaded into random access memory 22, the control program of read only memory 20 executes a jump to the transaction program, which thereafter controls operation of microprocessor 18 for the remainder of the transaction.

Step D is the initial step of the transaction program wherein identification data, previously read from the public area of card 12, is supplied to the program module 28. Module 28 uses the public identification information (ID), which is supplied by microprocessor 18, and a primary key (PK), which is contained in a secret area of programmable read only memory 62, to generate a derived key (DK) which will correspond to one of the derived keys contained on integrated circuit card 12. The derived key will be generated using the card identification information and the issuing organization identification information in connection with the encryption algorithm contained in read only memory 58 or programmable read only memory 62 in module 28.

At Step E in FIG. 5 microprocessor 18 sends a command to integrated circuit card 12 which causes the microprocessor on integrated circuit card 12 to generate and supply a first random number (RAND #1) to microprocessor 18. This first random number is supplied to program module 28, wherein the microprocessor 56 executes an encryption algorithm using the derived key (DK) to encrypt the random number which has been supplied. In the encryption process neither the primary key nor the derived key are provided to the microprocessor 18. These keys are retained within the program module 28 and arranged in a manner so that they are never transmitted out of the module according to the program contained in read only memory 58.

The first random number, which has been encrypted with the derived key, is returned from program module 28 to microprocessor 18 and thereafter to the IC card 12. (Step F) The IC card 12 is also provided with information (PKID) regarding which primary key has been used by the program module 28, so that it can select among the derived keys in its memory and perform a decryption algorithm to obtain what should be the identical number to the random number which its supplied to terminal processor 18. At Step G in FIG. 5, the card microprocessor compares the random number which it has decrypted and the random number which it originally supplied at Step E, and if these numbers match, it has assurance that the terminal to which it has been connected is an authentic terminal containing the necessary primary key and encryption algorithm for the transaction.

The programming which is contained on the integrated circuit card is arranged to restrict its operations until it has obtained the assurance that it is dealing with an authentic terminal. This prevents the unauthorized reading of information from the card and the unauthorized writing of information onto the card, which may modify the programmable read only memory on the card, for example, to change the authorized credit balance.

Once the terminal and program module has been authenticated at Step G, the terminal and program module go about a process of authenticating the integrated circuit card 12. At Step H, the terminal, or alternately the module, responds to the transaction program to generate a second random number (RAND #2). The second random number is supplied at Step I to both the program module and the card. The card uses the same derived key to decrypt the second random number and return the decrypted random number to the terminal. The decrypted random number is thereafter provided to the program module which performs the encryption algorithm to derive a random number from the number supplied by the card in decrypted form. At Step K the program module compares the originally supplied second random number with the random number which has been decrypted and re-encrypted to assure itself that the integrated circuit card contains a proper derived key, and is therefore an authentic card. This process requires that the card contain only the inverse encryption algorithm and that the module contain only the encryption algorithm, thereby providing increased security so that one card cannot be used to fraudulently operate and modify another card.

After authenticating the card at Step L, the terminal thereafter seeks to authenticate the identity of the person who has presented the card. In this respect a personal identification number (PIN), which is known only to that person may be entered in the terminal and combined with a third random number (RAND #3) at Step M. The third random number is provided to the integrated circuit card. The program module uses the combined third random number and the entered PIN to encrypt the combination according to the derived key at Step N. The encrypted PIN plus third random number is supplied to the card which decrypts the combination at Step O and compares the result with the combined third random number and the PIN, which is stored in the integrated circuit card at Step P. Again the integrated circuit card is arranged so that the card stored PIN is never provided in clear text form to equipment outside the integrated circuit card. The comparison in the card at Step P provides an assurance that the user is authorized and thereafter further transaction data can be entered and processed in the terminal microprocessor 18 (Step Q).

As an alternate to using a personal identification number the card may include biometric information derived from a measurement of a person's body and the biometric information may be obtained by terminal 18 and supplied to the card for comparison. As another alternative, there may be provided in stored form on the card biographic information, for example, a persons's mother's maiden name, which can be supplied through the terminal 18 by the person and compared with the information stored on the card.

In connection with processing the transaction at Step R, the transaction processing is governed according to the program supplied by program module 28 to random access memory 22 associated with microprocessor 18. Portions of this program can decide which transactions can take place off-line, without communications with the issuing bank's computer, and which transactions should be performed on-line by checking or updating the credit balance or other information with a bank's computer. The determination of which transaction method is used may depend on a variety of factors, for example, the remaining balance which can be read in secure form from integrated circuit card 12, the number of transactions or the transaction history recorded on integrated circuit card 12, or the size of the present transaction.

The actual transaction takes place at Step S. At the completion of the transaction, terminal 12 initiates steps to record transaction data. (Step T) Transaction data may be recorded in terminal programmable read only memory 24, may be recorded in disc form or tape form for later access for billing purposes, or alternately may be recorded in a programmable memory provided on program module 28. The transaction data may include, in addition to the transaction amount, authentication codes which indicate that the transaction has been properly carried out and authenticated.

The transaction may typically also be recorded on programmable read only memory which is contained on IC card 12. The writing of data onto ID card 12 is preferably performed using encrypting of the data for security purposes, particularly when the data being written modifies the available credit balance. Such encryption may be performed by the program module 28 or a remote computer. After the recording of the transaction information, the program ends and the terminal is prepared to receive the next card to execute a further transaction.

The example of a transaction and transaction program is illustrated in FIG. 5 is provided as exemplary only. Those skilled in the art will recognize that a wide variety of transaction steps may be provided to effectuate either secure on line, off line or other forms of transactions according to programs and security procedures which are specified by the organization which issues the particular card and supplies the program module to the terminal user. The terminal of the present invention provides a great deal of flexibility in executing such transactions so that the security arrangements can be closely supervised, monitored and designed by the issuing organization.

The use of microprocessor containing program modules provides a great deal of flexibility for performing system functions. For example, program module 28 may include test and diagnostic programs to cause it to not only test its own functions up on power-up or periodically, it may also provide commands to perform diagnostic and function verification on microprocessor 18 of transaction device 10 to verify that it has been connected to an authentic terminal, that the terminal is capable of performing its transaction program, and that terminal communications to a host computer are operative. In addition programs and program modification can be downloaded to the program module by the host computer provided appropriate security authorization is confirmed by the program module and host computer in a manner similar to the transaction operation. The program module can also be arranged to report its transaction records to a host computer when requested by the host computer. The program modules of the invention include non-volatile memory and can be easily distributed by mailing them to merchants for secure distribution of new or replacement modules with the keys securely written therein.

While there has been described what is believed to be the preferred embodiment of the invention, those skilled in the art will recognize that other and further changes and modifications may be made thereto without departing from the spirit of the invention. For example, instead of downloading an operating program from the selected module, e.g. 28, to the terminal, such program may be retained in the module 28, with module microprocessor 56 executing the transaction. Terminal microprocessor 18 would act to initialize communications between the card 12 and module 28, 32, or 36, and to execute certain tasks assigned by the module microprocessor 56, e.g., to establish on-line communications with a host computer. It is intended to claim all such changes and modifications that fall within the true scope of the invention.

We claim:

1. An electronic transaction device for performing transactions with any one of a plurality of diverse personal transaction identification devices, said identification devices including stored identification data and adapted to be used for diverse transaction function, said plurality including at least one personal identification device having a device microprocessor and a device program for use in transactions, comprising:
    first interface means for receiving any of said personal transaction identification devices for generating first data signals corresponding to said stored identification data;
    second interface means, including a plurality of receiving portions, for simultaneously receiving a plurality of program modules, and for generating second data signals corresponding to data stored on said program modules;
    at least one program module connected to one of said receiving portions of said second interface means and including a module microprocessor, a module program for operating said module microprocessor, and a transaction program for carrying out portions of said transactions with said microprocessor containing personal identification device;
    and a first data processing means, coupled to operate and receive data signals from said first and second interface means and including a control program responsive to said first data signals for selecting a program module, and for executing said transaction program.

2. An electronic transaction device as specified in claim 1, wherein said control program includes means for loading said second data, corresponding to a transaction program, into the first data processing means for executing the transaction program in the first data processing means.

3. An electronic transaction device as specified in claim 2, wherein there is further provided means for providing data communication between said first data processing means and one or more remote data processing means, and wherein said data communication means is operated under control of said transaction program.

4. An electronic transaction device as specified in claim 2, wherein said first interface means includes means for providing data to said personal identification device, and wherein said data providing means is operated under control of said transaction program.

5. An electronic transaction device as specified in claim 4, wherein at least one of said program modules includes means for encrypting data either received from said personal identification device or generated by said module and wherein said first interface means provides said encrypted data to said personal identification device.

6. A method for executing a transaction using a personal identification device having stored identification data and an electronic transaction device, adapted to receive said identification device and read identification data therefrom, said transaction device including data processing means including a first control program and a plurality of program modules, said modules each including a module microprocessor, at least one stored transaction program and at least one stored module program for operating said module microprocessor, comprising:
    connecting said identification device to said transaction device;
    operating said data processing means of said transaction device under said control program to read said identification data from said identification device and to select one of said program modules and one of said stored transaction programs in accordance with said identification data;
    operating said data processing means of said transaction device under said control program to load said selected transaction program from said selected program module:
    operating said data processing means of said transaction device under said selected transaction program to execute portions of a transaction;
    and operating said module microprocessor under said module program to execute portions of a transaction.

7. A method as specified in claim 6 for use with a personal identification device having a device, microprocessor a plurality of program modules each having a primary encrypting key, further comprising operating said module microprocessor under said module program to compute said derived encryption key from said identification data.

8. A method as specified in claim 7, further comprising the step of supplying a number to said device microprocessor and said module microprocessor, encrypting said number in said module microprocessor with said derived encryption key, decrypting said encrypted number in said device microprocessor and comparing said supplied number to said decrypted number.

9. A method as specified in claim 7, further comprising the step of supplying a number to said device microprocessor and said module microprocessor, encrypting said number in said device microprocessor and decrypting said encrypted number in said module microprocessor and comparing said supplied number to said decrypted number.

10. A method as specified in claim 7, further comprising encrypting a supplied number in said module microprocessor, said supplied number corresponding to data stored in said device, decrypting said encrypted supplied number in said device microprocessor and comparing said decrypted number to said stored data.

11. A program module for use in a transaction terminal of the type accepting personal transaction identification devices, wherein said devices include stored identification data, and wherein said transaction terminal includes a first interface means for receiving said personal transaction identification devices for generating first data signals corresponding to the stored identification data; a second interface means with at least two terminal connector means for detachably receiving program modules, said second interface means for generating second data signals corresponding to data stored in said program modules; and processor means within said transaction terminal for receiving data signals from said first and second interface means and including a control program responsive to said first data signals for selecting a program module; said program module comprising:

a module microprocessor;

module connector means for connecting said module microprocessor to said terminal connector means for communication with the terminal processor means;

a module program for operating said module microprocessor; and a transaction program executed by said terminal processor means for carrying out transactions with said personal transaction identification devices.

12. A program module as defined in claim 11, further including means for processing a stored encryption program and at least one stored key.

13. A program module as defined in claim 12, wherein the module includes electronic memory for storing said programs and said at least one stored key and is in the form of a card for housing said module microprocessor and memory.

* * * * *